United States Patent
Shirakawa (10) Patent No.: US 8,049,787 B2
(45) Date of Patent: Nov. 1, 2011

(54) IMAGE PROCESSING CIRCUIT, MOBILE TERMINAL AND METHOD FOR CONTROLLING SENSOR

(75) Inventor: Hirotsugu Shirakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 418 days.

(21) Appl. No.: 12/304,314

(22) PCT Filed: Apr. 25, 2007

(86) PCT No.: PCT/JP2007/058917
§ 371 (c)(1), (2), (4) Date: Dec. 11, 2008

(87) PCT Pub. No.: WO2007/145032
PCT Pub. Date: Dec. 21, 2007

(65) Prior Publication Data
US 2009/0201401 A1    Aug. 13, 2009

(30) Foreign Application Priority Data
Jun. 15, 2006 (JP) .................. 2006-165993

(51) Int. Cl.
H04N 5/225 (2006.01)
H04N 3/14 (2006.01)
H04N 5/228 (2006.01)

(52) U.S. Cl. .................. 348/220.1; 348/296; 348/222.1; 348/311

(58) Field of Classification Search .................. 348/296, 348/362–367, 220.1, 221.1, 222.1, 297, 302–307, 348/311, 207.99
See application file for complete search history.

(56) References Cited

U.S. PATENT DOCUMENTS

| 4,714,963 | A | 12/1987 | Vogel |
| 7,324,136 | B2 * | 1/2008 | Kubo ........................ 348/220.1 |
| 7,692,690 | B2 * | 4/2010 | Honma ...................... 348/220.1 |
| 7,733,414 | B2 * | 6/2010 | Kobayashi ................... 348/362 |
| 2004/0105028 | A1 * | 6/2004 | Watanabe .................... 348/363 |
| 2005/0174466 | A1 * | 8/2005 | Tanaka et al. ................ 348/335 |
| 2005/0179144 | A1 | 8/2005 | Hori |
| 2005/0200744 | A1 | 9/2005 | Kobayashi |

FOREIGN PATENT DOCUMENTS

| CN | 1534370 A | 10/2004 |
| CN | 1612594 A | 5/2005 |

(Continued)

OTHER PUBLICATIONS

International Search Report for PCT/JP2007/058917 mailed Jul. 3, 2007.
International Preliminary Report on Patentability for PCT/JP2007/058917 issued Dec. 16, 2008.

(Continued)

*Primary Examiner* — Lin Ye
*Assistant Examiner* — Marly Camargo (57) ABSTRACT

An image processing circuit capable of shooting a desired subject is provided in which increasing the size of the digital camera has been avoided. Sensor control unit 31 includes a moving image mode and a still image shooting mode. If a shutter button is operated when sensor control unit is driven in the moving image mode in which mechanical shutter 21 is open, image pickup control unit 37 stops the operation of sensor control unit. Then, after exposing image sensor 23 for a predetermined exposure time, image pickup control unit 37 closes mechanical shutter 21. Additionally, image pickup control unit 37 switches sensor control unit 31 to the still image shooting mode while mechanical shutter 21 is closed.

8 Claims, 4 Drawing Sheets

FOREIGN PATENT DOCUMENTS

| | | |
|---|---|---|
| JP | 2000023016 A | 1/2000 |
| JP | 2005110128 A | 4/2005 |
| JP | 2005311665 A | 11/2005 |
| JP | 2006033241 A | 2/2006 |
| JP | 2006058819 A | 3/2006 |

OTHER PUBLICATIONS

Chinese Office Action for CN200780022077.7 dated Apr. 26, 2010.
Supplementary European Search Report for EP 07 74 2352 dated Dec. 9, 2010.

\* cited by examiner

IMAGE PROCESSING CIRCUIT, MOBILE TERMINAL AND METHOD FOR CONTROLLING SENSOR

INCORPORATION BY REFERENCE

This application is the National Phase of PCT/JP2007/058917, filed Apr. 25, 2007, which claims priority to Japanese Patent Application No. 2006-165993, filed on Jun. 15, 2006, the disclosure of which is incorporated herein in its entirety by reference.

TECHNICAL FIELD

The present invention relates to an image processing circuit, a mobile terminal and a method for controlling a sensor, which are for shooting an image and a moving image.

BACKGROUND ART

In general, moving images for preview are displayed on a display unit in a digital camera. When a desired subject to be photographed is in the displayed moving images, the user presses a shutter button to shoot the subject as a still image.

In a digital camera, if an image to be shot has many pixels, it takes a lot of time to read out an image signal from an image sensor and to perform image processing on the image signal. Because of this, if the number of pixels of a moving image for a preview is similar to the number of pixels of a still image, a possibility arises in which an operation of the digital camera will be delayed.

Thus, when the digital camera shoots a still image, a drive mode of the image sensor needs to be switched from a moving image mode for shooting a moving image for a preview to a still image shooting mode for shooing a still image in which having the number of pixels Is greater than that of the moving image.

A technique for switching a moving image mode and a still image shooting mode has already been proposed.

Figure 1:
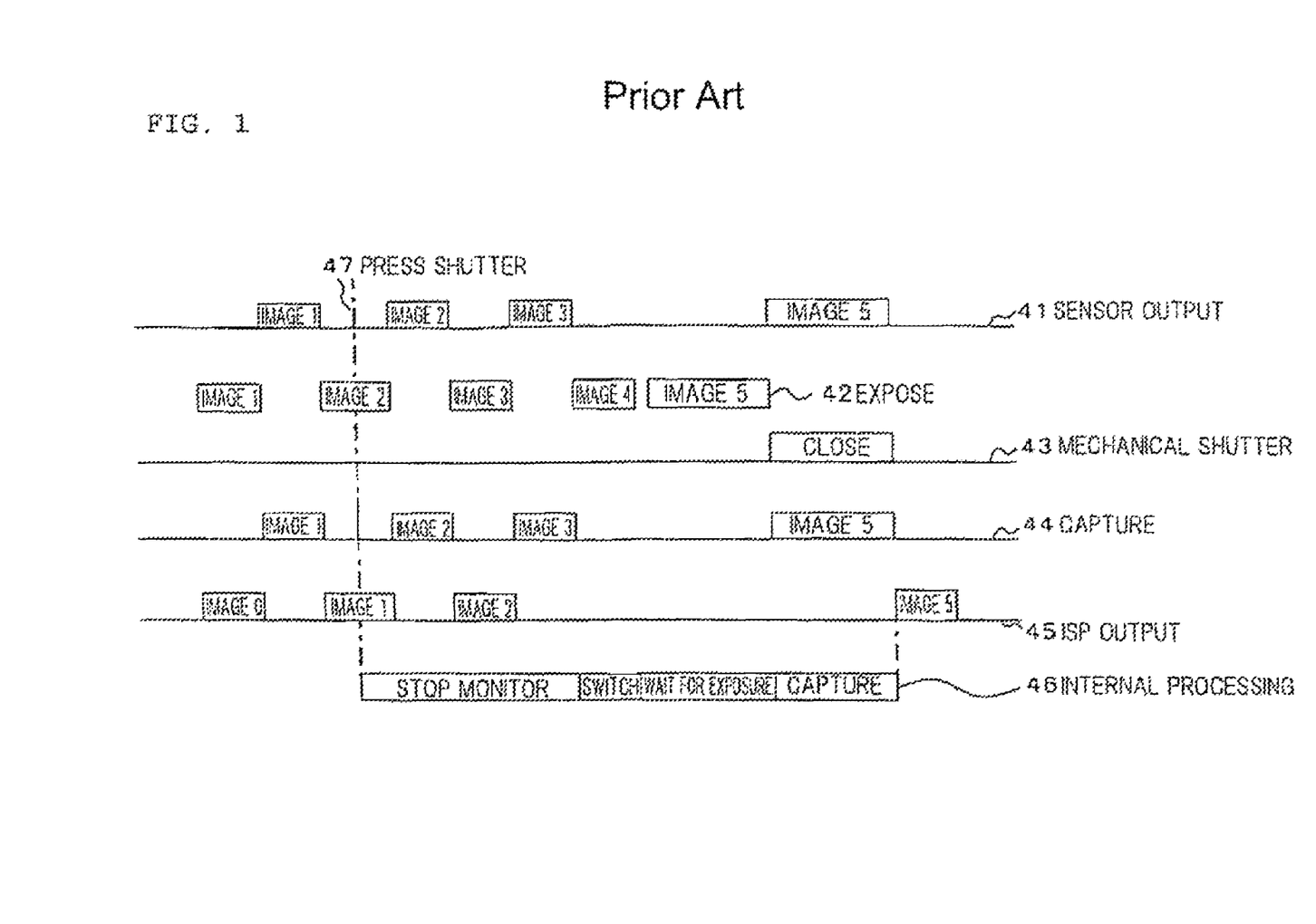
FIG. 1 is a time chart illustrating an exemplary operation of a conventional digital camera.

FIG. 1 is a time chart illustrating an operation of a digital camera for which a technique like this is used. The digital camera is operated in a moving image mode, and then, a shutter button is pressed for switching to a still image shooting mode.

An image sensor of the digital camera stores charges by making an exposure (expose 42) and outputs (sensor output 41) the charges as an image signal (image 1). An ISP (Image Signal Processor) captures the image signal (capture 44). The ISP performs image processing on the captured image signal and outputs the image signal in which the image processing has been preformed (ISP output 45). The image signal is displayed on a monitor.

Additionally, the image sensor starts an exposure for shooting a next image signal (image 2) when outputting the image signal (image 1).

When the shutter button is pressed (press shutter 47) while exposing the image signal (image 2), the digital camera initially stops displaying the image signal on the monitor (internal processing 46 (stop monitor)). The exposure and the output of the image signal by the image sensor are performed even while the digital camera stops displaying the image signal on the monitor.

Next, the digital camera switches the moving image mode to the still image shooting mode (internal processing 46 (switch)) and causes the image sensor to start an exposure for a still image (image 5). After that, when a predetermined time passes, the digital camera closes the mechanical shutter to end the exposure (mechanical shutter 43 (close)) and outputs images stored by the exposure.

However, if the exposure is started after the drive mode of the image sensor has been switched, it takes a lot of time to start the exposure after the shutter button has been pressed. Because of this, the user may not capture an image of a desired subject.

In Patent document 1 (Japanese Patent Laid-Open No. 2000-23016), a digital camera capable of reducing time from pressing the shutter button to starting the exposure is disclosed.

This digital camera includes a first CCD sensor and a second CCD sensor in which the number of pixels is greater than that of the first CCD sensor. In the moving image mode, the first CCD sensor captures a moving image and the moving image is displayed on an LCD. When a shutter button is pressed during a live view, the second CCD sensor starts shooting the still image.

Because of this, switching the drive mode of the image sensor is not necessary so that the time from pressing the shutter button to starting a shot can be reduced.

Patent document 1: Japanese Patent Laid-Open No. 2000-23016

Recently, mobile terminals such as mobile phones often include digital cameras. Because of this, downsizing digital cameras is required.

Like the digital camera disclosed in Patent document 1, when a dedicated sensor for shooting a still image is provided in addition to besides a dedicated sensor for shooting a moving image, the digital camera becomes larger. Additionally, it is possible to remove a function that displays the moving image for previewing it from the digital camera and to shoot a desired subject through the finder (window for confirming a composition). In this case, the digital camera also becomes larger.

An object of the present invention is to provide an image processing circuit, a mobile terminal and a method for controlling a sensor, which are capable of shooting a desired subject but which does not lead to an increase in the size of the digital camera.

DISCLOSURE OF THE INVENTION

In order to achieve the object, an image processing circuit of the present invention controls an image sensor outputting an image signal showing an image by an exposure and a mechanical shutter capable of interrupting the exposure of the image sensor and that that is connected to a shutter button, the image processing circuit comprises: a sensor control unit including a moving image mode for periodically outputting the image signal from the image sensor and a still image shooting mode for outputting the image signal for a still image from the image sensor; and an image pickup control unit for stopping operation of the sensor control unit if the shutter button is operated when the sensor control unit is driven in the moving image mode in which the mechanical shutter is open, then closing the mechanical shutter after exposing the image sensor for a predetermined exposure time, and switching a mode of the sensor control unit to the still image shooting mode while the mechanical shutter is closed.

Also, a method for controlling a sensor of the present invention is performed by an image processing circuit including a sensor control unit including a moving image mode periodically outputting an image signal from an image sensor outputting the image signal showing an image by an exposure and a still image shooting mode for outputting the image signal for a still image from the image sensor, controlling the image sensor and a mechanical shutter capable of interrupting the exposure of the image sensor, and connected to a shutter button, the method comprises: stopping operation drive of the sensor control unit if the shutter button is operated when the sensor control unit is operated in the moving image mode with the mechanical shutter open; closing the mechanical shutter after exposing the image sensor for a predetermined exposure time; and switching a mode of the sensor control unit to the still image shooting mode while the mechanical shutter is closed.

Also, a mobile terminal of the present invention with a shooting function comprises: an image sensor outputting an image signal showing an image by an exposure; a mechanical shutter capable of interrupting the exposure of the image sensor; a shutter button; a sensor control unit including a moving image mode for periodically outputting the image signal from the image sensor and a still image shooting mode for outputting the image signal for a still image from the image sensor; and an image pickup control unit for stopping operation of the sensor control unit if the shutter button is operated when the sensor control unit is operated in the moving image mode in which the mechanical shutter is open, then closing the mechanical shutter after exposing the image sensor for a predetermined exposure time, and switching a mode of the sensor control unit to the still image shooting mode while the mechanical shutter is closed.

Also, a method for controlling a sensor of the present invention is performed by a mobile terminal including an image sensor outputting an image signal showing an image by an exposure, a mechanical shutter capable of interrupting the exposure of the image sensor, a shutter button, and a sensor control unit including a moving image mode for periodically outputting the image signal from the image sensor and a still image shooting mode for outputting the image signal for a still image from the image sensor, the method comprises: stopping operation of the sensor control unit if the shutter button is operated when the sensor control unit is operated in the moving image mode with the mechanical shutter open; closing the mechanical shutter after exposing the image sensor for a predetermined exposure time; and switching a mode of the sensor control unit to the still image shooting mode while the mechanical shutter is closed.

According to the invention, operation of the sensor control unit is stopped if the shutter button is operated when the sensor control unit is driven in the moving image mode with the mechanical shutter open. Then, the mechanical shutter is closed after the image sensor is exposed for the predetermined exposure time. Additionally, the mode of the sensor control unit is switched to the still image shooting mode while the mechanical shutter is closed.

Because of this, it is possible to start an exposure earlier than starting an exposure after switching a mode even though respective dedicated image sensors for the moving image mode and the still image shooting mode, or a finder are not provided. Accordingly, a desired subject can be shot without increasing the size of the digital camera.

Additionally, it is desired that the invention further comprise an image processing unit receiving an image signal from the image sensor and that performs image processing on the image signal, and that the image pickup control unit further stop operation of the image processing unit when the shutter button is operated.

According to the invention, the image processing is further stopped if the shutter button is operated. Because of this, it is possible to start an exposure earlier than switching a mode after the image processing is completed.

According to the invention, a desired subject can be shot without leading to an increase in the size of the digital camera.

BEST MODE FOR CARRYING OUT THE INVENTION

Hereinafter, an exemplary embodiment of the present invention will be described with reference to the drawings.

Figure 2:
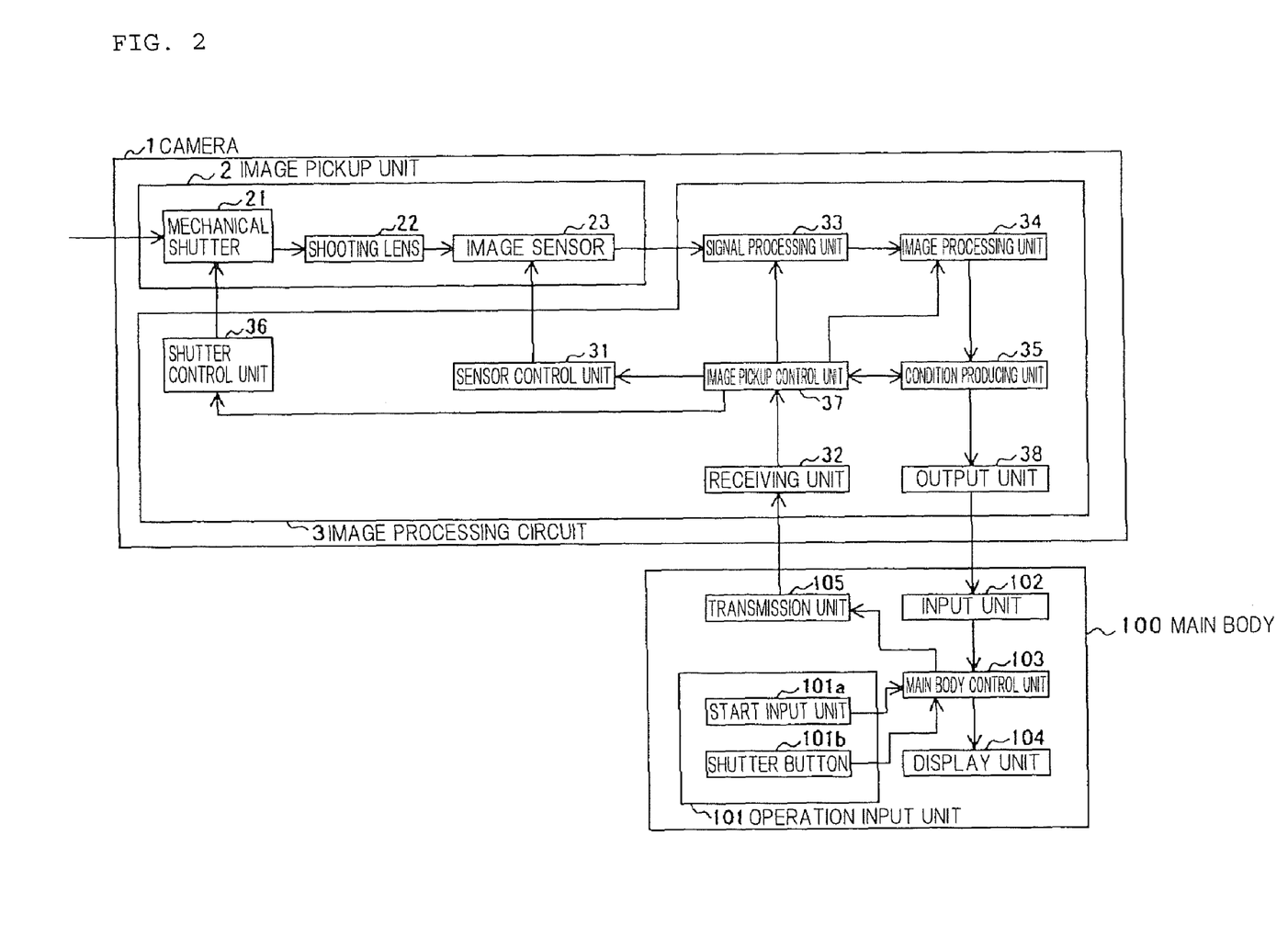
FIG. 2 is a block diagram showing a configuration of a mobile terminal in an exemplary embodiment of the present invention.

FIG. 2 is a block diagram showing a configuration of a mobile terminal in the exemplary embodiment of the present invention. The mobile terminal is, for example, a mobile phone. Further, the mobile terminal is not limited to a mobile phone and can be appropriately changed. Additionally, the mobile terminal includes a shooting function.

In FIG. 2, the mobile terminal includes camera 1 and main body unit 100.

Camera 1 includes image pickup unit 2 and image processing circuit 3.

Image pickup unit 2 outputs an image signal shows an image taken by an exposure to image processing circuit 3.

Image pickup unit 2 includes mechanical shutter 21, shooting lens 22 and image sensor 23.

Mechanical shutter 21 is, for example, a lens shutter or a focal-plane shutter. Further, mechanical shutter 21 is not limited to a lens shutter or a focal-plane shutter and can be appropriately changed.

Mechanical shutter 21 can interrupt an exposure of image sensor 23.

Shooting lens 22 forms an optical image of a subject on image sensor 23. Shooting lens 11 may include a focus lens and a zoom lens.

Image sensor 23 is, for example, a CMOS image sensor or a CCD image sensor. Further, image sensor 23 is not limited to a CMOS image sensor or a CCD image sensor and can be appropriately changed.

Image sensor 23 outputs an image signal shows an image taken by an exposure.

Specifically, image sensor 23 includes a plurality of light receiving elements that store charges by an exposure that reads out the charges stored in the respective light receiving elements, and output an image signal according to the charges. The respective light receiving elements are arranged two-dimensionally in longitudinal and lateral directions. Image sensor 23 also includes an electronic shutter and closes the electronic shutter to prevent double-exposure when the charges are read out.

Additionally, image sensor 23 cancels the charges stored in the respective light receiving elements. In this case, image sensor 23 closes the electronic shutter, and then, cancels the charges.

Image sensor 23 outputs the image signal, opens/closes the electronic shutter and cancels the charges in response to a control signal from sensor control unit 31.

Image processing circuit 3 controls an operation of image pickup unit 2. Additionally, image processing circuit 3 receives an image signal from shooting unit 2 and performs image processing on the image signal. Image processing circuit 3 is, for example, an ISP.

Image processing circuit 3 includes sensor control unit 31, receiving unit 32, signal processing unit 33, image processing unit 34, condition producing unit 35, shutter control unit 36, image pickup control unit 37 and output unit 38.

Sensor control unit 31 includes a moving image mode and a still image shooting mode with control unit 31 being operated in one of these modes.

The moving image mode is a mode for periodically outputting an image signal from image sensor 23 and for shooting an image (moving image) using a preview for shooting a still image by the user. In the moving image mode, a time interval for outputting the image signal is, for example, 1/60 seconds or 1/30 seconds.

The still image shooting mode is a mode for outputting an image signal using a still image from image sensor 23 and shooting a still image.

As the number of light receiving elements having charges read out increases, the image quality of an image improves, while the frame rate (velocity for reading out a charge) becomes slow. Accordingly, it is desirable that the number of light receiving elements having charges read out in the moving image mode be less than the number of light receiving elements having charges read out in the still image shooting mode for increasing the frame rate.

For example, sensor control unit 31 reads out the charges stored in all the light receiving elements in the still image shooting mode and reads out the charges stored in one-third of all the light receiving elements in the moving image mode.

Receiving unit 32 receives a shooting instruction for shooting a still image and a start instruction for shooting a moving image that will be preview from main body unit 100.

Signal processing unit 33 includes at least an A/D converter, receives an image signal from image sensor 23, and converts the image signal to a digital signal.

Image processing unit 34 receives the image signal from image sensor 23. Specifically, image processing unit 34 receives the image signal (hereinafter, RAW data) converted to the digital signal at signal processing unit 33 from image sensor 23.

Image processing unit 34 performs image processing on the RAW data for producing image processing data. The image processing is, for example, a black level correction process, a WB correction process, a γ correction process, an image compression process and the like. Further, the image processing is not limited to a black level correction process, a WB correction process, a γ correction process and an image compression process, and can be appropriately changed.

Condition producing unit 35 produces an exposure condition for outputting an image signal using a still image based on the image processing data produced at image processing unit 34. The exposure condition at least indicates an exposure time for outputting the image signal.

Shutter control unit 36 controls opening/closing of mechanical shutter 21. Shutter control unit 36 opens/closes mechanical shutter 21 in response to a shutter control signal from image pickup control unit 37.

Image pickup control unit 37 controls operations of mechanical shutter 21, sensor control unit 31, signal processing unit 33, image processing unit 34 and condition producing unit 35.

When receiving unit 32 receives the start instruction, image pickup control unit 37 outputs the shutter control signal indicating opening of mechanical shutter 21 and opens mechanical shutter 21.

When opening mechanical shutter 21, image pickup control unit 37 sets the moving image mode in sensor control unit 31, and then, operated sensor control unit 31. Because of this, sensor control unit 31 is operated in the moving image mode with mechanical shutter 21 open.

When receiving unit 32 receives the shooting instruction, image pickup control unit 37 stops operation sensor control unit 31, signal processing unit 33 and image processing unit 34.

After stopping the operation of sensor control unit 31, signal processing unit 33 and image processing unit 34, image pickup control unit 37 exposes image sensor 23 for a predetermined time, and then closes mechanical shutter 21. Additionally, image pickup control unit 37 switches a operation mode of sensor control unit 31 and operates sensor control unit 31 while mechanical shutter 21 is closed.

It is desirable that image pickup control unit 37 cause condition producing unit 35 to produce an exposure condition and that the exposure condition indicate the predetermined time. However, if the time is set in advance, the set time may be employed.

Since image sensor does not perform an exposure while mechanical shutter 21 is closed, charges stored in image sensor (specifically, light receiving element) are kept. Because of this, there is no problem if image pickup control unit 37 switches a mode of sensor control unit 31 from the moving image mode to the still image shooting mode, and then, there is no problem if sensor control unit 31 reads out the charges stored in the respective light receiving elements and outputs an image signal according to the charges while mechanical shutter 21 is closed.

Main body unit 100 includes operation input unit 101, input unit 102, main body control unit 103, display unit 104 and transmission unit 105.

Operation input unit 101 includes start input unit 101a and shutter button 101b.

Start input unit 101a is, for example, a button and outputs a start instruction to main body control unit 103 when operated by the user.

Shutter button 101b outputs a shooting instruction to main body control unit 103 when operated by the user.

Input unit 102 receives image processing data from camera 1.

When input unit 102 receives the image processing data, main body control unit 103 displays the image processing data on display unit 104.

When shutter button 101b is operated, main body control unit 103 outputs the shooting instruction to receiving unit 32 of camera 1. When start input unit 101a is operated, main body control unit 103 further outputs the start instruction to receiving unit 32 of camera 1.

When receiving unit 32 receives the shooting instruction, image pickup control unit 37 stops the operation of sensor control unit 31, signal processing unit 33 and image processing unit 34. Because of this, when shutter button 101b is operated, image pickup control unit 37 stops the operation of sensor control unit 31, signal processing unit 33 and image processing unit 34.

Display unit 6 is, for example, an LCD. Further, display unit 6 is not limited to an LCD and can be appropriately changed.

Next, an operation will be schematically described.

Figure 3:
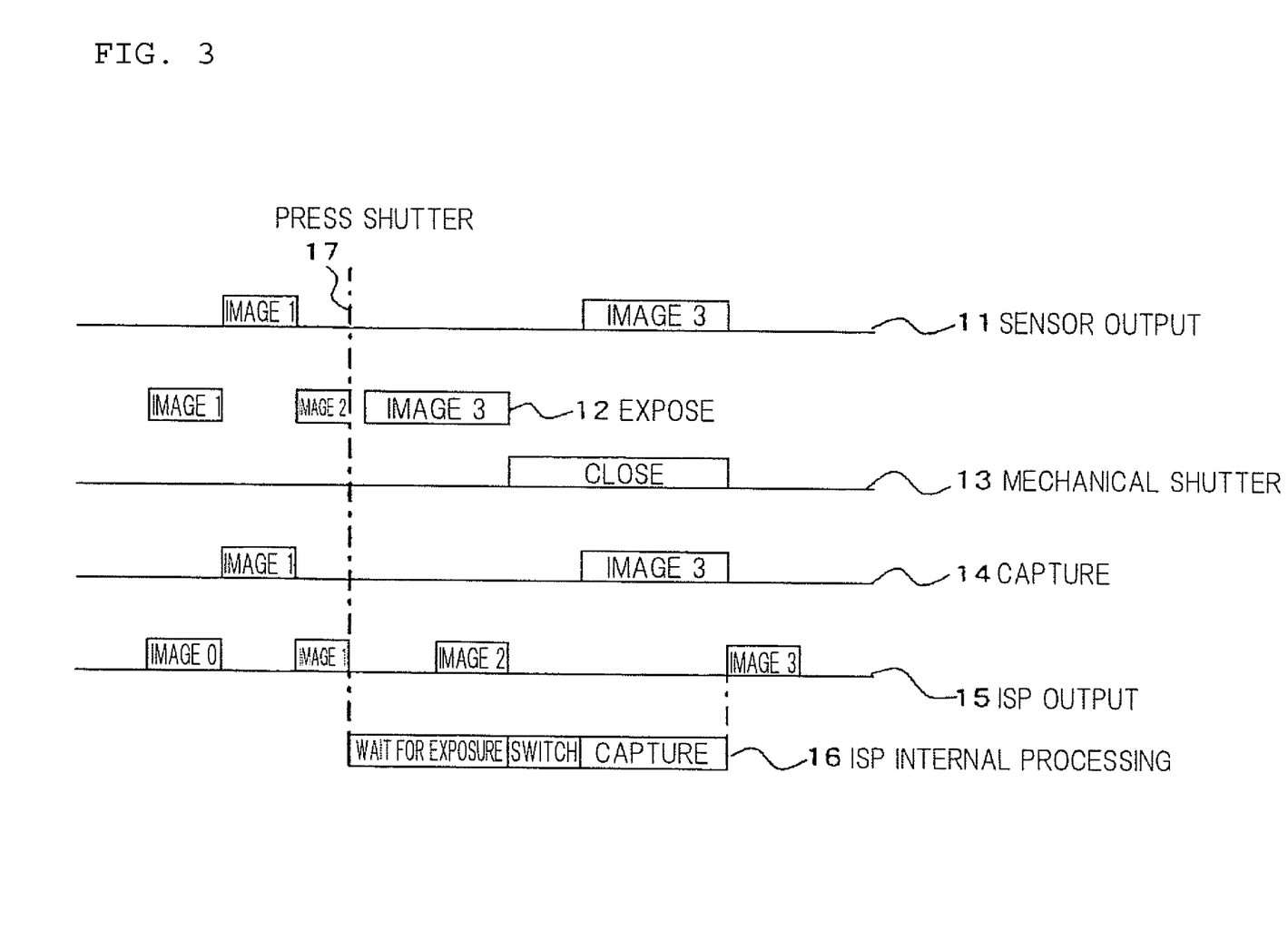
FIG. 3 is a time chart illustrating an exemplary operation of the mobile terminal.

FIG. 3 is a time chart schematically illustrating an operation of the mobile terminal. It is assumed that the mobile terminal is operated in the moving image mode, and then, that the shutter button is operated for switching to the still image shooting mode.

Image sensor 23 stores charges by an exposure (expose 12 (image 1)) and outputs an image signal according to the charges (sensor output 11 (image 1)).

Image processing unit 34 receives the image signal (capture 14 (image 1)), performs image signal processing for producing image processing data, and outputs the image processing data (ISP output 15 (image 1)).

On the other hand, when outputting the image signal, image sensor 23 performs an exposure for the next image signal (expose 12 (image 2)). Thus, the exposure of image sensor 23 (expose 12) and image processing on the image signal by image processing unit 34 (capture 14 and ISP output 15) are simultaneously performed.

When the shutter button is pressed (press shutter 17) during the exposure (expose 12 (image 2)) of image sensor 23, image pickup control unit 37 stops the operation of sensor control unit 31, signal processing unit 33 and image processing unit 34.

At this time, for example, if main body control unit 103 displays image processing data on display unit 104 after image processing unit 34 has already output the image processing data, the image processing data (image 1) will be not displayed because the image processing has stopped. In this case, when shutter button 101*b* is operated, display of a moving image is stopped in display unit 104 because image processing data (image 0) that has already been output before the image processing was stopped is displayed.

Image pickup control unit 37 stops operation of sensor control unit 31, signal processing unit 33 and image processing unit 34, and then, exposes image sensor 23 for a predetermined time (ISP internal processing 16 (wait for exposure)).

When the predetermined time passes, image pickup control unit 37 closes mechanical shutter 21 (mechanical shutter 13 (close)) to switch a mode of sensor control unit 31 to the still image shooting mode (ISP internal processing 16 (switch)) while mechanical shutter 21 is closed.

When the mode of operation is switched, sensor control unit 31 reads out charges stored in the respective light receiving elements by an exposure from image sensor 23 and outputs an image signal (sensor output 11 (image 3)) according to the charges. Image processing unit 34 receives the image signal (ISP internal processing 36 (capture)).

Next, operations will be described.

Initially, an operation of displaying a moving image is described.

When operated by the user, start input unit 101*a* outputs a start instruction to main body control unit 103. Main body control unit 103 outputs the start instruction to receiving unit 32 through transmission unit 105 when receiving the start instruction.

Receiving unit 32 outputs the start instruction to image pickup control unit 37 when receiving the start instruction. Image pickup control unit 37 receives the start instruction.

Image pickup control unit 37 outputs a shutter control signal indicating opening of mechanical shutter 21 to shutter control unit 36. Shutter control unit 36 opens mechanical shutter 21 when receiving the shutter control signal.

If camera 1 is set to end an operation in which mechanical shutter 21 is open, image pickup control unit 37 can skip this operation when receiving unit 32 receives the start instruction.

Image pickup control unit 37 outputs a setting signal instructing sensor control unit 31 to set the moving image mode. When receiving the setting signal, sensor control unit 31 sets the moving image mode in itself and outputs a response signal indicating that the mode setting has been completed to image pickup control unit 37. Image pickup control unit 37 receives the response signal. If camera 1 is set to end an operation in which the moving image mode is set in sensor control unit 31, image pickup control unit 37 can skip this operation.

Image pickup control unit 37 outputs an operation instruction to sensor control unit 31. Sensor control unit 31 periodically outputs a control signal indicating the output of an image signal to image sensor 23 when receiving the operation instruction.

Image sensor 23 reads out charges stored in the respective light receiving elements and outputs an image signal according to the charges to signal processing unit 33 whenever receiving the control signal. When outputting the image signal, image sensor 23 starts an exposure for a next image signal to be output.

When receiving the image signal, signal processing unit 33 converts the image signal on a digital signal for producing RAW data and outputs the RAW data to image processing unit 34.

Image processing unit 34 receives the RAW data and performs an image processing to the RAW data for producing image processing data. Image processing unit 34 outputs the image processing data to condition producing unit 35.

When receiving the image processing data, condition producing unit 35 records the image processing data in itself and outputs the image processing data to input unit 102 through output unit 38. Condition producing unit 35 only records in itself the most recently received image processing data and may delete image processing data that was received prior to that.

Input unit 102 outputs the image processing data to main body control unit 103 upon receiving the image processing data. Main body control unit 103 displays the image processing data on display unit 104 upon receiving the image processing data.

Next, an operation of switching a drive mode will be described.

Figure 4:
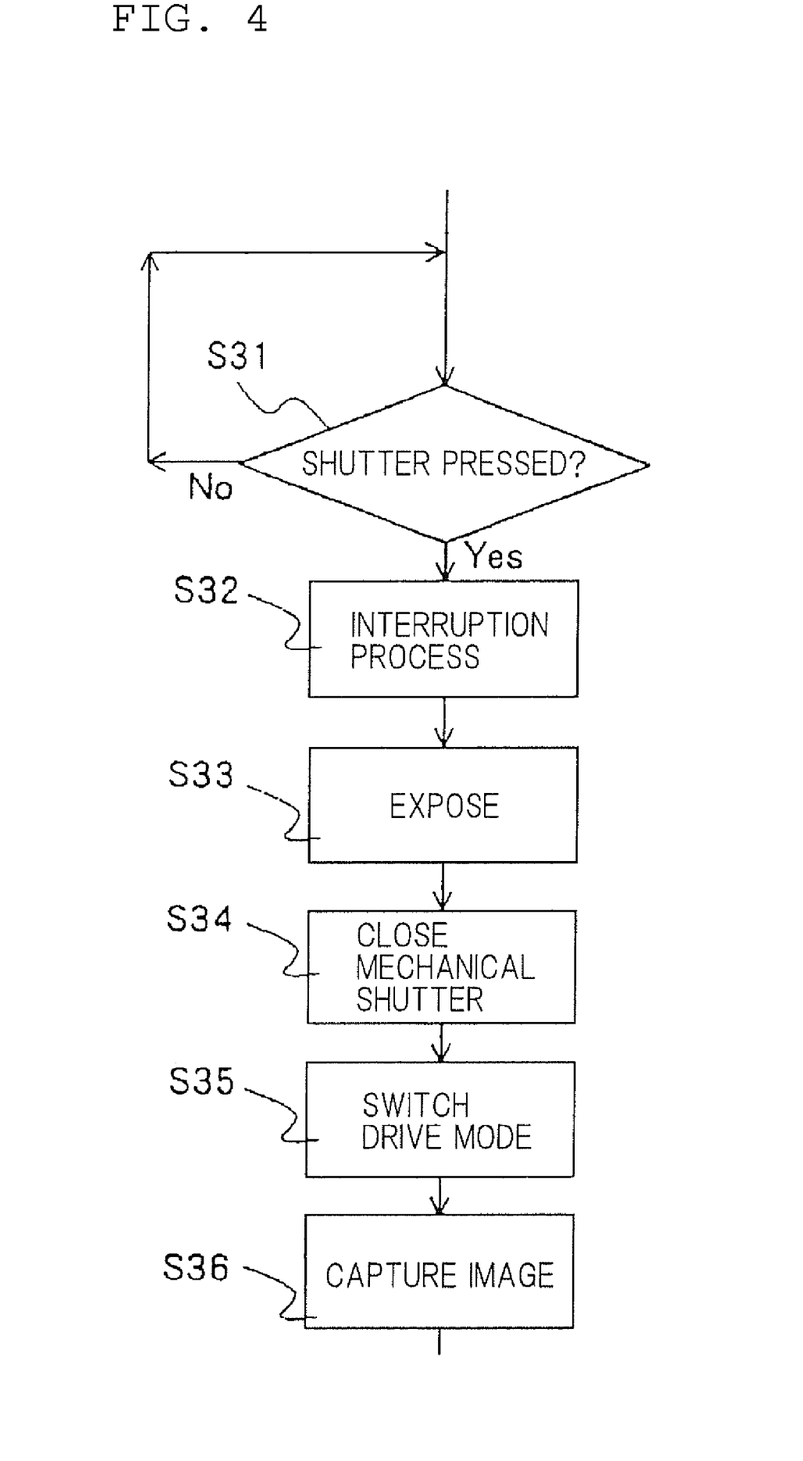
FIG. 4 is a flowchart illustrating an exemplary operation of the mobile terminal.

FIG. 4 is a flowchart illustrating an operation of switching a mode of operation. Additionally, sensor control unit 31 is set in the moving image mode.

In step S31, main body control unit 103 determines whether shutter button 101*b* has been pressed or not by determining whether a shooting instruction from shutter button 101*b* has been received or not. Main body control unit 103 performs step S32 if shutter button 101*b* has been pressed, and performs step S31 if shutter button 101*b* has not been pressed.

In step S32, main body control unit 103 outputs the shooting instruction to receiving unit 32 through transmission unit 105. Receiving unit 32 outputs the shooting instruction to image pickup control unit 37 upon receiving the shooing instruction.

When receiving the shooting instruction, image pickup control unit 37 outputs a stop instruction for stopping operation to sensor control unit 31, signal processing unit 33 and image processing unit 34.

When receiving the stop instruction, sensor control unit 31 stops outputting a control signal indicating reading out a charge and outputs a control signal indicating cancellation of a charge to image sensor 23. When receiving the control signal, image sensor 23 closes the electronic shutter, and then, cancels the charges stored in the respective light receiving elements.

Signal processing unit 33 stops converting an image signal to a digital signal upon receiving the stop instruction. Additionally, signal processing unit 33 cancels the image signal.

When receiving the stop instruction, image processing unit 34 stops image processing of RAW data and cancels the RAW data.

Image pickup control unit 37 performs step S33 when outputting the stop instruction.

In step S33, image pickup control unit 37 outputs a production instruction for producing an exposure condition to condition producing unit 35. When receiving the production instruction, condition producing unit 35 produces an exposure condition based on the most recently recorded image processing data and outputs the exposure condition to image pickup control unit 37. When receiving the exposure condition, image pickup control unit 37 outputs opening information indicating opening of the electronic shutter of image sensor 23 to sensor control unit 31.

Sensor control unit 31 outputs a control signal indicating opening of the electronic shutter to image sensor 23 upon receiving the opening information. Image sensor 23 opens the electronic shutter upon receiving the control signal.

On the other hand, when the exposure time passes after outputting the opening information, image pickup control unit 37 performs step S34.

In step S34, image pickup control unit 37 outputs a shutter control signal indicating closing of mechanical shutter 21 to shutter control unit 36. Shutter control unit 36 closes mechanical shutter 21 upon receiving the shutter control signal.

When outputting the shutter control signal, image pickup control unit 37 performs step S35.

In step S35, image pickup control unit 37 outputs a setting signal indicating switching of a mode of operation to sensor control unit 31. Sensor control unit 31 switches a mode of operation to the still image shooting mode upon receiving the setting signal. When switching the mode of operation, sensor control unit 31 outputs a response signal indicating that switching the mode of operation has completed to image pickup control unit 37.

Sensor control unit 31 performs step S36 upon receiving the response signal.

In step S36, image pickup control unit 37 outputs an operation instruction to sensor control unit 31.

Sensor control unit 31 outputs a control signal indicating reading out a charge to image sensor 23 upon receiving the operation instruction.

When receiving the control signal, image sensor 23 reads out charges stored in the respective light receiving elements and outputs an image signal according to the charges to signal processing unit 33. At this time, in the moving image mode, the number of light receiving elements in which image sensor 23 reads out charges is larger than the number of upon light receiving elements in which image sensor 23 reads out the charges when receiving the control signal indicating the output of an image signal.

Signal processing unit 33 captures the image signal, converts the image signal to a digital signal for producing RAW data, and outputs the RAW data to image processing unit 34. Image processing unit 34 captures the RAW data and performs image processing on the RAW data for producing image processing data. Image processing unit 34 outputs the image processing data to input unit 102 through condition producing unit 35 and output unit 38. Input unit 102 outputs the image processing data to main body control unit 103 upon receiving the image processing data. Main body control unit 103 displays the image processing data on display unit 104 upon receiving the image processing data.

According to the exemplary embodiment, sensor control unit 31 includes the moving image mode and the still image shooting mode. If the shutter button is operated when the sensor control unit is operated in the moving image mode in which mechanical shutter 21 is open, image pickup control unit 37 stops operation of sensor control unit. Then, after exposing image sensor 23 for a predetermined exposure time, image pickup control unit 37 closes mechanical shutter 21. Additionally, image pickup control unit 37 switches sensor control unit 31 to the still image shooting mode while mechanical shutter 21 is closed.

In this case, it is possible to start an exposure earlier than starting an exposure after switching the mode even though respective dedicated image sensors for the moving image mode and the still image shooting mode or the finder are not provided. Accordingly, a desired subject can be shot without leading to increase in size of the digital camera.

Additionally, in the exemplary embodiment, image processing unit 34 receives an image signal from image sensor 23 and performs an image processing on the image signal. When the shutter button is operated, image pickup control unit 37 further stops operation of the image processing unit.

In this case, it is possible to start an exposure earlier than switching the mode after the image processing has been completed.

In the exemplary embodiment described above, the configuration shown in the drawings is only an example and the present invention is not limited to the configuration.

For example, signal processing unit 33 further includes a CDS (correlated double sampling device) and an amplifier, and may remove the noise of an image signal and amplify an image signal. In this case, when receiving the stop instruction, signal processing unit 33 further stops removing the noise of the image signal and stops amplifying the image signal.

Additionally, mechanical shutter 21 is provided in front of shooting lens 22 in FIG. 2, while mechanical shutter 21 may be provided between shooting lens 22 and image sensor 23.

What is claimed is:

1. An image processing circuit for controlling an image sensor outputting an image signal showing an image by an exposure and a mechanical shutter capable of interrupting the exposure of the image sensor and that is connected to a shutter button, the image processing circuit comprises:

a sensor control unit including a moving image mode for periodically outputting the image signal from the image sensor and a still image shooting mode for outputting the image signal for a still image from the image sensor; and an image pickup control unit for skipping operation of the sensor control unit if the shutter button is operated when the sensor control unit is operated in the moving image mode with the mechanical shutter open, then closing the mechanical shutter after exposing the image sensor for a predetermined exposure time, and switching a mode of the sensor control unit to the still image shooting mode while the mechanical shutter is closed.

2. The image processing circuit according to claim 1, further comprising an image processing unit receiving an image signal from the image sensor and performing image signal processing, wherein the image pickup control unit further stops operation of the image processing unit when the shutter button is operated.

3. A mobile terminal with a shooting function comprises:
an image sensor outputting an image signal showing an image by an exposure;
a mechanical shutter capable of interrupting the exposure of the image sensor;
a shutter button;
a sensor control unit including a moving image mode for periodically outputting the image signal from the image sensor and a still image shooting mode for outputting the image signal for a still image from the image sensor; and
an image pickup control unit for skipping operation of the sensor control unit if the shutter button is operated when the sensor control unit is operated in the moving image mode in which the mechanical shutter is open, then closing the mechanical shutter after exposing the image sensor for a predetermined exposure time, and switching a mode of the sensor control unit to the still image shooting mode while the mechanical shutter is closed.

4. The mobile terminal according to claim 3, further comprising an image processing unit receiving an image signal from the image sensor and performing image signal processing,
wherein the image pickup control unit further stops operation of the image processing unit when the receiving unit receives the change instruction.

5. A method for controlling a sensor executed by an image processing circuit including a sensor control unit including a moving image mode periodically outputting an image signal from an image sensor outputting the image signal showing an image by an exposure and a still image shooting mode for outputting the image signal for a still image from the image sensor, controlling the image sensor and a mechanical shutter capable of interrupting the exposure of the image sensor, and that is connected to a shutter button, the method comprises:
skipping operation of the sensor control unit if the shutter button is operated when the sensor control unit is driven in the moving image mode with the mechanical shutter open;
closing the mechanical shutter after exposing the image sensor for a predetermined exposure time; and
switching a mode of the sensor control unit to the still image shooting mode while the mechanical shutter is closed.

6. The method for controlling a sensor according to claim 5, further comprising:
receiving an image signal from the image sensor;
performing image processing on the image signal; and
stopping the image processing on the image signal when the shutter button is operated.

7. A method for controlling a sensor executed by a mobile terminal including an image sensor outputting an image signal showing an image by an exposure, a mechanical shutter capable of interrupting the exposure of the image sensor, a shutter button, and a sensor control unit including a moving image mode for periodically outputting the image signal from the image sensor and a still image shooting mode for outputting the image signal for a still image from the image sensor, the method comprises:
skipping operation of the sensor control unit if the shutter button is operated when the sensor control unit is driven in the moving image mode in which the mechanical shutter is open;
closing the mechanical shutter after exposing the image sensor for a predetermined exposure time; and
switching a mode of the sensor control unit to the still image shooting mode while the mechanical shutter is closed.

8. The method for controlling a sensor according to claim 7, further comprising:
receiving an image signal from the image sensor;
performing an image processing on the image signal; and
stopping the image processing on the image signal when the shutter button is operated.

* * * * *